(12) United States Patent
Gill

(10) Patent No.: US 9,665,146 B1
(45) Date of Patent: May 30, 2017

(54) APPARATUS, SYSTEM, AND METHOD FOR IMPROVING NETWORK DEVICES' COMPATIBILITY WITH DIFFERENT TYPES OF POWER SOURCES

(71) Applicant: Juniper Networks, Inc., Sunnyvale, CA (US)

(72) Inventor: Jaspal S. Gill, Tracy, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 156 days.

(21) Appl. No.: 14/472,343

(22) Filed: Aug. 28, 2014

(51) Int. Cl.
G06F 1/26 (2006.01)
H02J 4/00 (2006.01)

(52) U.S. Cl.
CPC . G06F 1/26 (2013.01); H02J 4/00 (2013.01)

(58) Field of Classification Search
CPC ..................... G06F 1/26; H02J 4/00
See application file for complete search history.

(56) References Cited

U.S. PATENT DOCUMENTS

| | | | | |
|---|---|---|---|---|
| 7,382,624 B2* | 6/2008 | Barsun | ...................... | G06F 1/26 174/50 |
| 7,877,622 B2* | 1/2011 | Gruendler | ........... | G06F 11/2015 307/18 |
| 2003/0077928 A1* | 4/2003 | Vander Vorste | ..... | H01R 13/743 439/106 |
| 2003/0085622 A1* | 5/2003 | Hailey | ................... | G06F 1/263 307/52 |
| 2004/0109374 A1* | 6/2004 | Sundar | ...................... | H02J 1/08 365/226 |
| 2005/0028014 A1* | 2/2005 | Allred | ...................... | H02J 3/14 713/300 |
| 2005/0253560 A1* | 11/2005 | Popescu-Stanesti | ...... | H02J 1/08 320/138 |
| 2009/0164824 A1* | 6/2009 | Langgood | ............... | H02J 3/005 713/340 |
| 2011/0212634 A1* | 9/2011 | Lieberman | ................ | G06F 1/26 439/136 |
| 2012/0068544 A1* | 3/2012 | Bushue | ................... | H02J 1/102 307/80 |
| 2013/0047030 A1* | 2/2013 | Soeda | ..................... | G06F 1/263 714/14 |

(Continued)

OTHER PUBLICATIONS

"IEC 60320", http://en.wikipedia.org/wiki/IEC_60320, as accessed Jul. 28, 2014, Wikipedia, (Dec. 15, 2005).

Primary Examiner — Nitin Patel
Assistant Examiner — Kevin Stewart
(74) Attorney, Agent, or Firm — FisherBroyles, LLP

(57) ABSTRACT

The disclosed apparatus may include (1) a power distribution unit that distributes electric power to a network device, the power distribution unit including (A) a first set of power inputs that are compatible with a first type of power source and (B) a second set of power inputs that are compatible with a second type of power source that is different from the first type of power source, and (2) a set of power supply modules electrically coupled to the power distribution unit, each power supply module within the set of power supply modules being capable of outputting electric power to the network device upon receiving current via either the first set of power inputs or the second set of power inputs. Various other apparatuses, systems, and methods are also disclosed.

16 Claims, 7 Drawing Sheets

(56) References Cited

U.S. PATENT DOCUMENTS

2015/0194821 A1* 7/2015 Yoshimoto ............ H02M 3/158
　　　　　　　　　　　　　　　　　　　　　320/107
2015/0333515 A1* 11/2015 Tseng ...................... F04D 25/06
　　　　　　　　　　　　　　　　　　　　　318/438

* cited by examiner

Method 600

```
            ┌─────────┐
            │  Start  │
            └────┬────┘
                 ▼
┌────────────────────────────────────────────────────────────┐
│ Receive, by a set of power supply modules, electric        │
│ current from a power distribution unit of a network device │
│ that includes a first set of power inputs that are         │
│ compatible with a first type of power source and a second  │
│ set of power inputs that are compatible with a second type │
│ of power source that is different from the first type of   │
│ power source                                               │
│                          610                               │
└──────────────────────────┬─────────────────────────────────┘
                           ▼
┌────────────────────────────────────────────────────────────┐
│ Output, by the set of power supply modules, electric power │
│ to a set of components within the network device based at  │
│ least in part on an amount of electric current received by │
│ each power supply module within the set of power supply    │
│ modules via either the first set of power inputs or the    │
│ second set of power inputs included in the power           │
│ distribution unit                                          │
│                          620                               │
└──────────────────────────┬─────────────────────────────────┘
                           ▼
                    ┌─────────┐
                    │   End   │
                    └─────────┘
```

*FIG. 6*

APPARATUS, SYSTEM, AND METHOD FOR IMPROVING NETWORK DEVICES' COMPATIBILITY WITH DIFFERENT TYPES OF POWER SOURCES

BACKGROUND

Network devices are often used to facilitate the flow of data within a network and/or across multiple networks. For example, a network may include various routers that transfer data between endpoint devices. These routers may be located at different physical sites that offer different types of power sources.

Unfortunately, traditional network devices may include power system hardware designed specifically for a particular type of power source. For example, a traditional router may include power system hardware designed specifically for an International Electrotechnical Commission (IEC) C19/C20 (20 amp) power source. As a result, this traditional router may be incompatible with IEC C13/C14 (15 amp) power sources and/or twist-lock (32 amp) power sources. The incompatible nature of such power system hardware may lead routing equipment manufacturers to produce different router models to accommodate the various types of power sources offered at customer sites.

The instant disclosure, therefore, identifies and addresses a need for apparatuses, systems, and methods for improving network devices' compatibility with different types of power sources.

SUMMARY

As will be described in greater detail below, the instant disclosure generally relates to apparatuses, systems, and methods for improving network devices' compatibility with different types of power sources. In one example, an apparatus for accomplishing such a task may include (1) a power distribution unit that distributes electric power to a network device, the power distribution unit including (A) a first set of power inputs that are compatible with a first type of power source and (B) a second set of power inputs that are compatible with a second type of power source that is different from the first type of power source, and (2) a set of power supply modules electrically coupled to the power distribution unit, each power supply module within the set of power supply modules being capable of outputting electric power to the network device upon receiving current via either the first set of power inputs or the second set of power inputs.

Similarly, a network device incorporating the above-described apparatus may include (1) a network interface, (2) a power distribution unit that distributes electric power to the network interface, the power distribution unit including (A) a first set of power inputs that are compatible with a first type of power source and (B) a second set of power inputs that are compatible with a second type of power source that is different from the first type of power source, and (3) a set of power supply modules electrically coupled to the power distribution unit, each power supply module within the set of power supply modules being capable of outputting electric power to the network interface upon receiving current via either the first set of power inputs or the second set of power inputs.

A corresponding method may include (1) receiving, by a set of power supply modules, electric current from a power distribution unit of a network device that includes (A) a first set of power inputs that are compatible with a first type of power source and (B) a second set of power inputs that are compatible with a second type of power source that is different from the first type of power source and then (2) outputting, by the set of power supply modules, electric power to a set of components within the network device based at least in part on an amount of electric current received by each power supply module within the set of power supply modules via either the first set of power inputs or the second set of power inputs included in the power distribution unit.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 6 is a flow diagram of an exemplary method for improving network devices' compatibility with different types of power sources.

Figure 1:
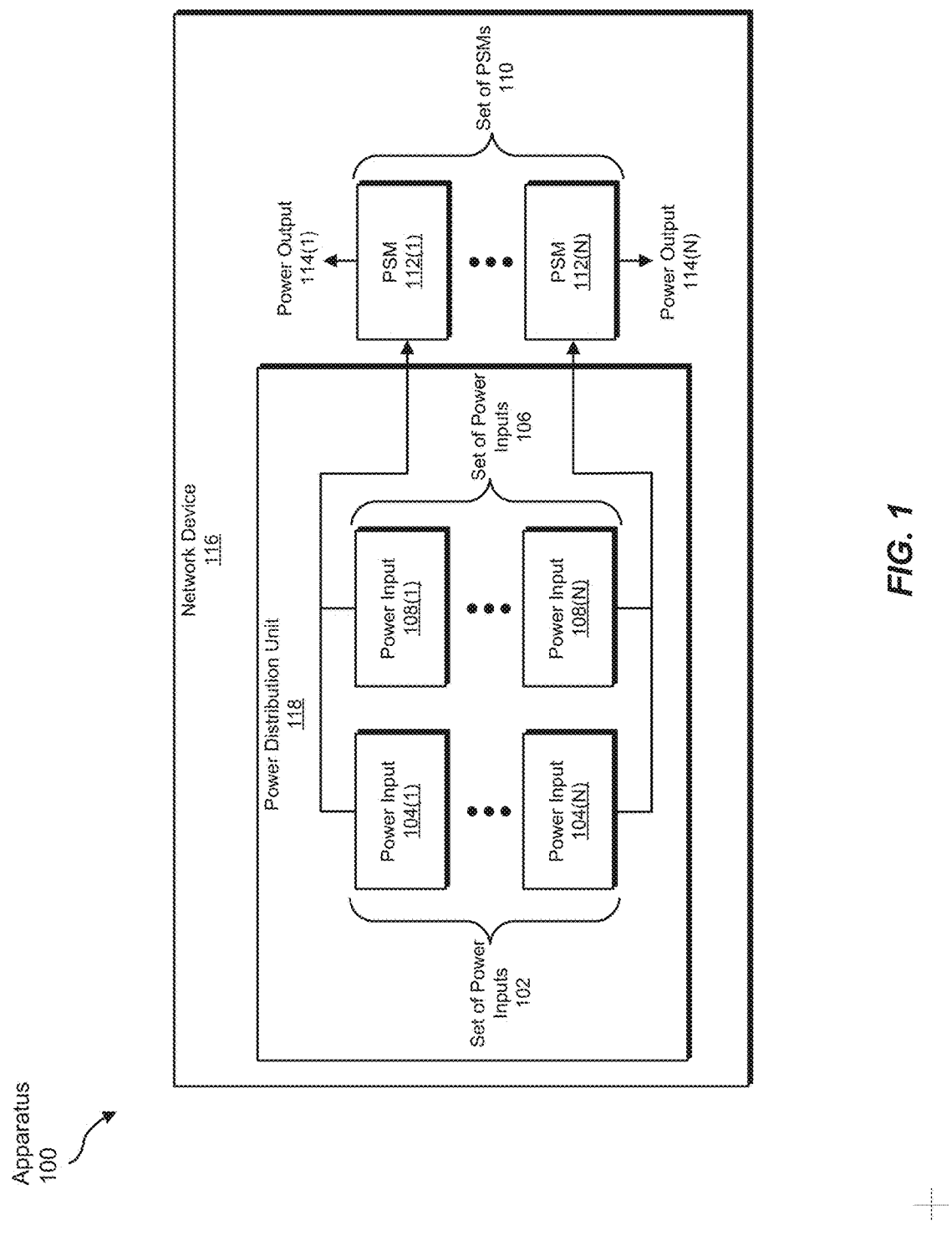
FIG. 1 is a block diagram of an exemplary apparatus for improving network devices' compatibility with different types of power sources.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for improving network devices' compatibility with different types of power sources. As will be explained in greater detail below, the various apparatuses, systems, and methods described herein may provide a power distribution unit that includes different types of power inputs on a network device. By providing such a power distribution unit on a network device, the various apparatuses, systems, and methods described herein may improve the network device's compatibility with different types of power sources. Additionally or alternatively, the various apparatuses, systems, and methods described herein may provide a movable mechanical cover that prevents the power distribution unit from simultaneously exposing and/or providing access to the different types of power inputs on the network device.

The following will provide, with reference to FIGS. 1-5, examples of apparatuses that improve network devices' compatibility with different types of power sources. The discussion corresponding to FIG. 6 will provide a detailed description of an exemplary method for improving network devices' compatibility with different types of power sources. Finally, the discussion corresponding to FIG. 7 will provide numerous examples of systems that may include the apparatus shown in FIG. 1.

FIG. 1 shows a block diagram of an exemplary apparatus 100 for improving network devices' compatibility with different types of power sources. The terms "compatibility" and "compatible," as used herein, generally refer to the ability of a network device and/or a power input to properly function, match, and/or work with a type of power source. As shown in FIG. 1, apparatus 100 may include a power distribution unit 118 that distributes electric power to a network device 116.

The term "power distribution unit" (sometimes abbreviated to "PDU"), as used herein, generally refers to any type or form of physical device and/or mechanism that facilitates the intake of electric current and/or power from a set of power sources and/or the distribution of electric current and/or power to a network device. The term "network device," as used herein, generally refers to any type or form of computing device that facilitates the flow of data traffic within a network and/or across multiple networks. Examples of network device 116 include, without limitation, routers, switches, network hubs, gateways, service delivery gateways, nodes, bridges, servers, firewalls, Next Generation FireWalls (NGFWs), Deep Packet Inspection (DPI) systems, exemplary computing system 700 in FIG. 7, variations of one or more of the same, combinations of one or more of the same, portions of one or more of the same, or any other suitable network device. In one example, network device 116 may represent a hop that forwards data traffic along a path within a network and/or across multiple networks.

Power distribution unit 118 may include a first set of power inputs 102 and a second set of power inputs 106. In one example, the first set of power inputs 102 may include power inputs 104(1)-(N). In this example, the second set of power inputs 106 may include power inputs 108(1)-(N).

The term "power input," as used herein, generally refers to any type or form of physical input, inlet, connector, cable, and/or coupler that facilitates the flow and/or intake of electric current and/or power. Examples of power inputs 104(1)-(N) and/or 108(1)-(N) include, without limitation, Alternating Current (AC) power inputs, Direct Current (DC) power inputs, IEC C19/C20 couplers, IEC C13/C14 couplers, twist-lock couplers, IEC C1/C2 couplers, IEC C3/C4 couplers, IEC C5/C6 couplers, IEC C7/C8 couplers, IEC C9/C10 couplers, IEC C11/C12 couplers, IEC C15/C16 couplers, IEC C15A/C16A couplers, IEC C17/C18 couplers, IEC C21/C22 couplers, IEC C23/C24 couplers, variations of one or more of the same, combinations of one or more of the same, or any other suitable power inputs.

In one example, power inputs 104(1)-(N) may each be compatible with a first type of power source. Additionally or alternatively, power inputs 108(1)-(N) may each be compatible with a second type of power source that is different from the first type of power source. The term "power source," as used herein, generally refers to any type or form of physical device and/or mechanism that provides and/or supplies electric current and/or power. Examples of types of power sources include, without limitation, AC power sources, DC power sources, IEC C19/C20 power sources, IEC C13/C14 power sources, twist-lock power sources, IEC C1/C2 power sources, IEC C3/C4 power sources, IEC C5/C6 power sources, IEC C7/C8 power sources, IEC C9/C10 power sources, IEC C11/C12 power sources, IEC C15/C16 power sources, IEC C15A/C16A power sources, IEC C17/C18 power sources, IEC C21/C22 power sources, IEC C23/C24 power sources, variations of one or more of the same, combinations of one or more of the same, or any other suitable power sources.

In some examples, power inputs 104(1)-(N) may be electrically coupled to power inputs 108(1)-(N), respectively. For example, power inputs 104(1) and 108(1) may both connect to the same circuit node. Additionally or alternatively, power inputs 104(N) and 108(N) may both connect to the same circuit node.

In some examples, power inputs 104(1)-(N) and power inputs 108(1)-(N) may have different maximum current ratings. The term "maximum current rating," as used herein, generally refers to a maximum amount of current that a power input is capable of handling and/or carrying without sustaining damage. As a specific example, power inputs 104(1)-(N) may each have a maximum current rating of 20 amps. In this example, power inputs 108(1)-(N) may have a maximum current rating of 30 amps.

The first set of power inputs 102 and the second set of power inputs 106 may serve a variety of different purposes. For example, set of power inputs 102 may facilitate the flow and/or intake of electric current and/or power from a first type of power source. In this example, set of power inputs 106 may facilitate the flow and/or intake of electric current and/or power from a second type of power source. Since customer sites may offer one type of power source but not the other, the combined sets of power inputs 102 and 106 may enable network device 116 to operate at a broader range of customer sites. Accordingly, network equipment manufacturers may no longer need to produce a different network device model for each type of power source offered at customer sites.

As shown in FIG. 1, apparatus 100 may also include a set of Power Supply Modules (PSMs) 110 electrically coupled to power distribution unit 118. The term "power supply module" and the abbreviation "PSM," as used herein, generally refer to any type or form of physical device and/or mechanism that regulates and/or outputs electric power upon receiving electric current and/or power. In one example, set of PSMs 110 may include PSMs 112(1)-(N). In this example, PSMs 112(1)-(N) may have power outputs 114(1)-(N), respectively, capable of outputting electric power to network device 116.

The term "power output," as used herein, generally refers to any type or form of output, outlet, connector, cable, and/or coupler that facilitates the flow and/or distribution of electric current and/or power. In one example, the electric power outputted by power output 114(1) may be commensurate with the amount of current received by PSM 112(1) from either power input 104(1) or 108(1). Similarly, the electric power outputted by power output 114(N) may be commensurate with the amount of current received by PSM 112(N) from either power input 104(N) or 108(N).

In one example, PSMs 112(1)-(N) may each convert electric current from one form to another. Additionally or alternatively, PSMs 112(1)-(N) may each regulate a voltage and/or power level outputted to network device 116.

As a specific example, power inputs 104(1)-(N) may each represent an IEC C19/C20 coupler compatible with 20-amp AC power sources. In this example, power inputs 104(1)-(N) may each be connected to a 20-amp AC power source, and power inputs 108(1)-(N) may each remain disconnected. Accordingly, PSMs 112(1)-(N) may receive approximately 20 amps of AC from power inputs 104(1)-(N) and then convert the approximately 20 amps of AC to approximately 3 kilowatts of DC power outputted via power outputs 114(1)-(N).

As another example, power inputs 108(1)-(N) may each represent an IEC C13/C14 coupler compatible with 30-amp AC power sources. In this example, power inputs 108(1)-(N) may each be connected to a 30-amp AC power source, and power inputs 104(1)-(N) may each remain disconnected. Accordingly, PSMs 112(1)-(N) may receive approximately 30 amps of AC from power inputs 104(1)-(N) and then convert the approximately 30 amps of AC to approximately 4.4 kilowatts of DC power outputted via power outputs 114(1)-(N).

As an alternative example, power inputs 108(1)-(N) may each represent a DC coupler compatible with certain DC power sources. In this example, power inputs 108(1)-(N) may each be connected to a compatible DC power source, and power inputs 104(1)-(N) may each remain disconnected. Accordingly, PSMs 112(1)-(N) may receive DC from power inputs 108(1)-(N) and then regulate a voltage and/or power level outputted via power outputs 114(1)-(N).

Figure 2:
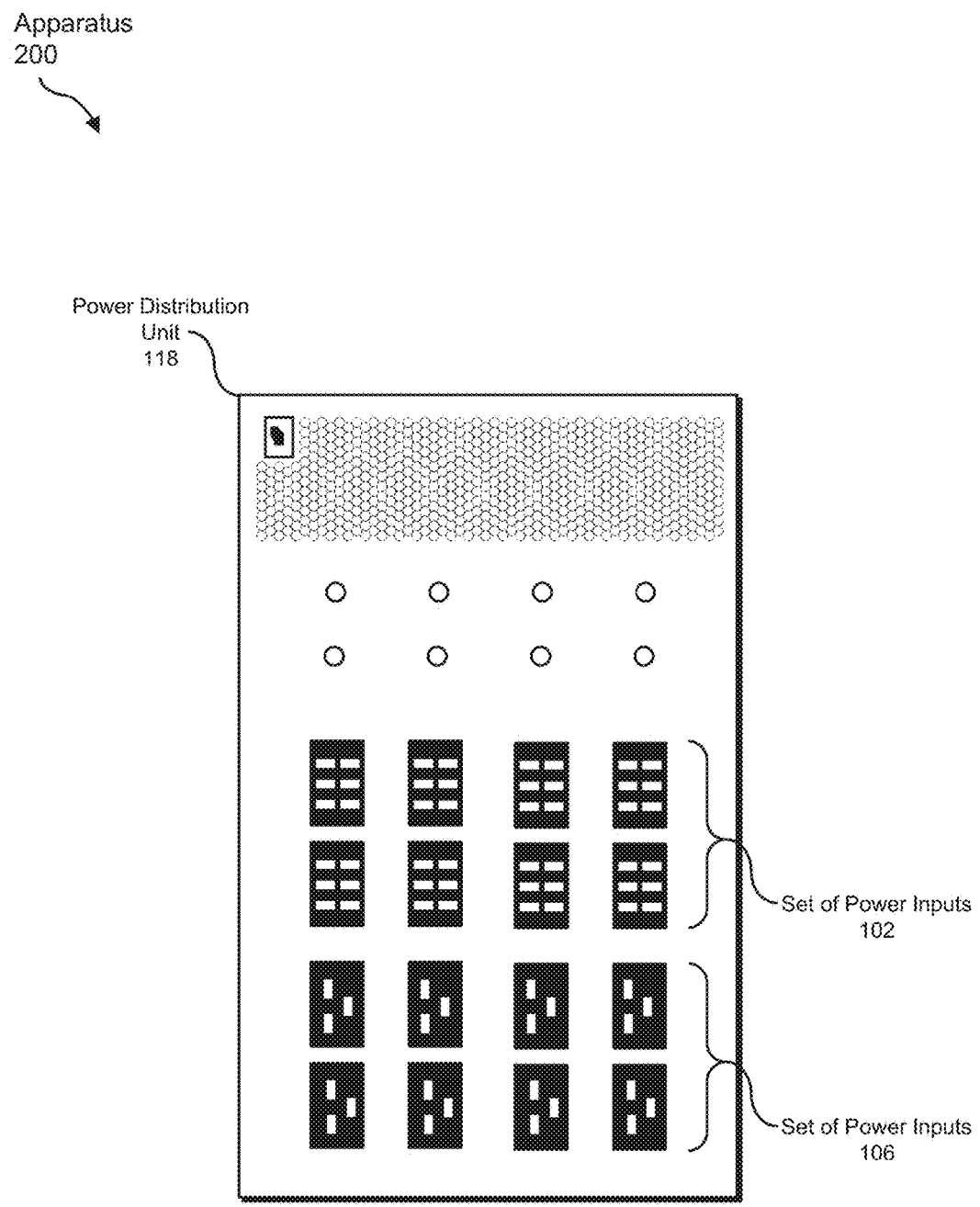
FIG. 2 is a block diagram of an exemplary apparatus for improving network devices' compatibility with different types of power sources.

Exemplary apparatus 100 in FIG. 1 may be implemented in a variety of ways. For example, all or a portion of exemplary apparatus 100 may represent portions of exemplary apparatus 200 in FIG. 2. As shown in FIG. 2, apparatus 200 may include a power distribution unit 118 that distributes electric power to a network device. Power distribution unit 118 may include set of power inputs 102 and set of power inputs 106. In this example, set of power inputs 102 may include 8 different power inputs that are compatible with a first type of power source. Similarly, set of power inputs 106 may include 8 different power inputs that are compatible with a second type of power source.

Figure 3:
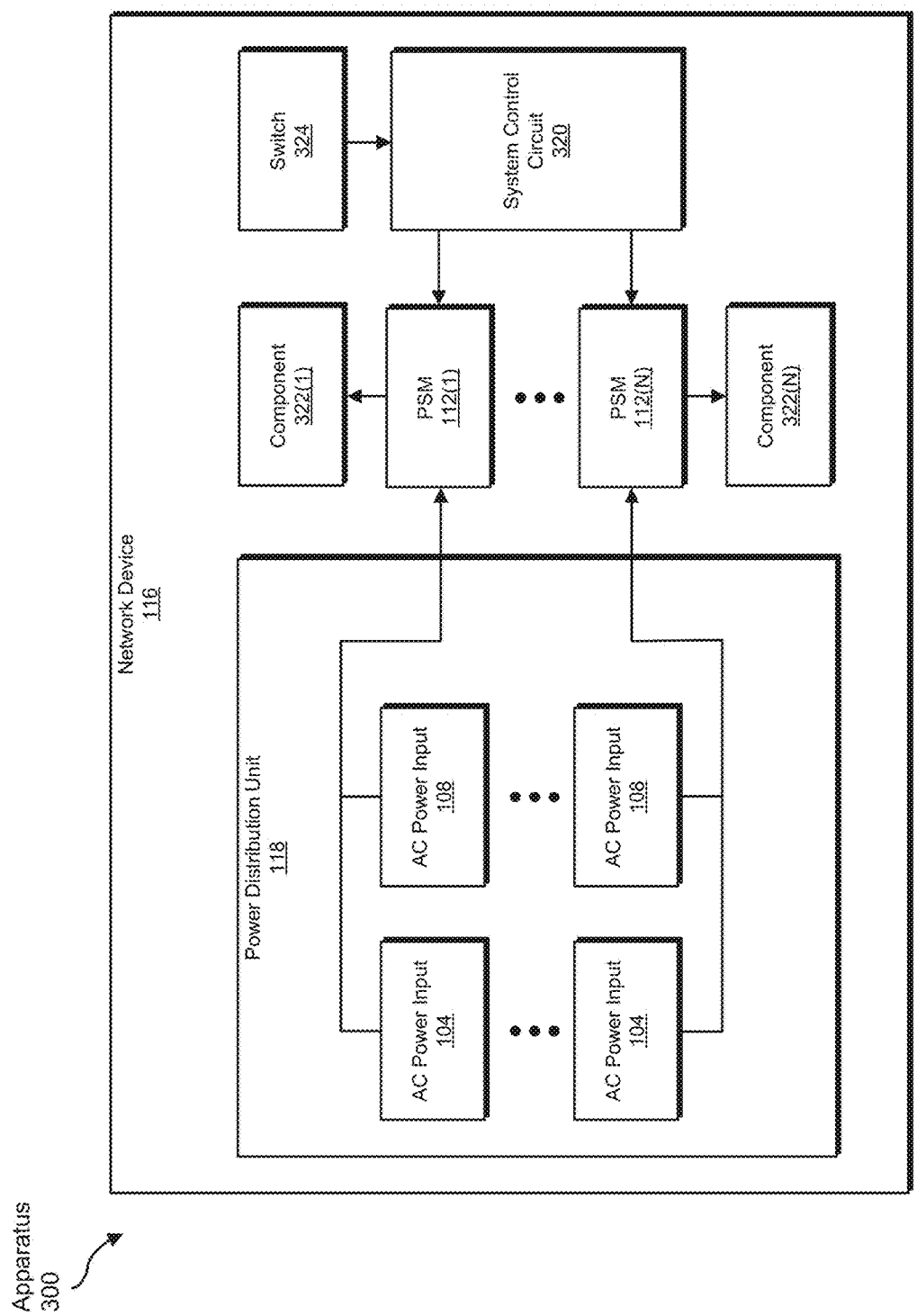
FIG. 3 is a block diagram of an exemplary apparatus for improving network devices' compatibility with different types of power sources.

Additionally or alternatively, all or a portion of exemplary apparatus 100 may represent portions of exemplary apparatus 300 in FIG. 3. As illustrated in FIG. 3, apparatus 300 may include PSMs 112(1)-(N) electrically coupled to power distribution unit 118. Apparatus 300 may also include a system control circuit 320 communicatively coupled to PSMs 112(1)-(N) and/or a switch 324 that mechanically interfaces with a movable mechanical cover (not illustrated in FIG. 3) that prevents power distribution unit 118 from simultaneously exposing both set of power inputs 102 and set of power inputs 106.

The term "system control circuit," as used herein, generally refers to any type or form of physical hardware, circuit, and/or device that performs certain Input/Output (I/O) operations and/or computing tasks by processing and/or executing computer-readable instructions. Examples of system control circuit 220 include, without limitation, processors, microprocessors, microcontrollers, Field-Programmable Gate Arrays (FPGAs), Central Processing Units (CPUs), Application-Specific Integrated Circuits (ASICs), variations of one or more of the same, combinations of one or more of the same, or any other suitable system control circuit. Although illustrated as a stand-alone device in FIG. 3, system control circuit 320 may alternatively represent a portion of power distribution unit 118.

The term "switch," as used herein, generally refers to any type or form of component and/or mechanism capable of providing and/or omitting an electric signal in accordance with certain input. Examples of switch 224 include, without limitation, contact switches, tactile switches, biased switches, push-button switches, toggle switches, electronic switches, relays, variations of one or more of the same, combinations of one or more of the same, or any other suitable switch.

Figure 4:
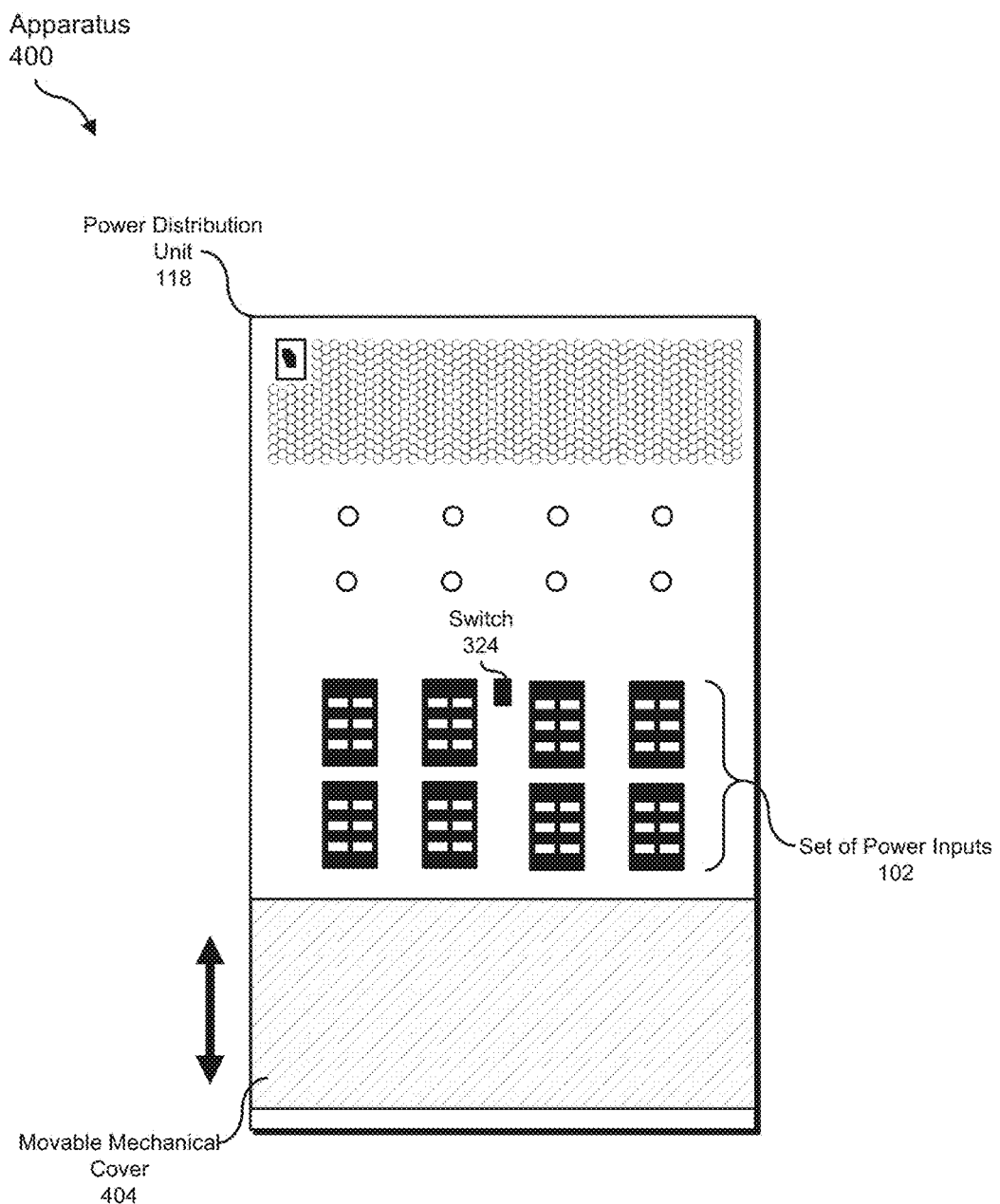
FIG. 4 is a block diagram of an exemplary apparatus for improving network devices' compatibility with different types of power sources.

In one example, switch 224 may mechanically interface with a movable mechanical cover 404 in FIG. 4. The term "movable mechanical cover," as used herein, generally refers to any type or form of mechanical and/or physical cover or material capable of preventing a power distribution unit from simultaneously exposing certain power inputs. For example, movable mechanical cover 404 may shield, cover, and/or move over set of power inputs 102 or set of power inputs 106. By shielding, covering, and/or moving over set of power inputs 102 or set of power inputs 106 in this way, movable mechanical cover 404 may effectively prevent simultaneous exposure of set of power inputs 102 and set of power inputs 106.

As illustrated in FIG. 4, movable mechanical cover 404 may slide over set of power inputs 106. By sliding over set of power inputs 106 in this way, movable mechanical cover 404 may effectively prevent exposing set of power inputs 106. Moreover, by preventing exposure of set of power inputs 106, movable mechanical cover 404 may stop a user from electrocuting himself or herself by touching any of power inputs 106 (which may be electrically coupled to set of power inputs 102). Additionally or alternatively, by preventing exposure of set of power inputs 106, movable mechanical cover 404 may stop a user from connecting different power sources to set of power inputs 102 and set of power inputs 106 at the same time (which could potentially cause an electrical short and/or damage the power distribution system at a customer site).

In one example, moveable mechanical cover 404 may fail to engage switch 324 when movable mechanical cover 404 is positioned over set of power inputs 106. As a result, switch 324 may fail to provide an electric signal to system control circuit 320. In this example, system control circuit 320 may interpret this failure to provide an electric signal as an indicator that (1) movable mechanical cover 404 is currently positioned over set of power inputs 106 and/or (2) set of power inputs 102 are currently exposed and/or accessible.

Figure 5:
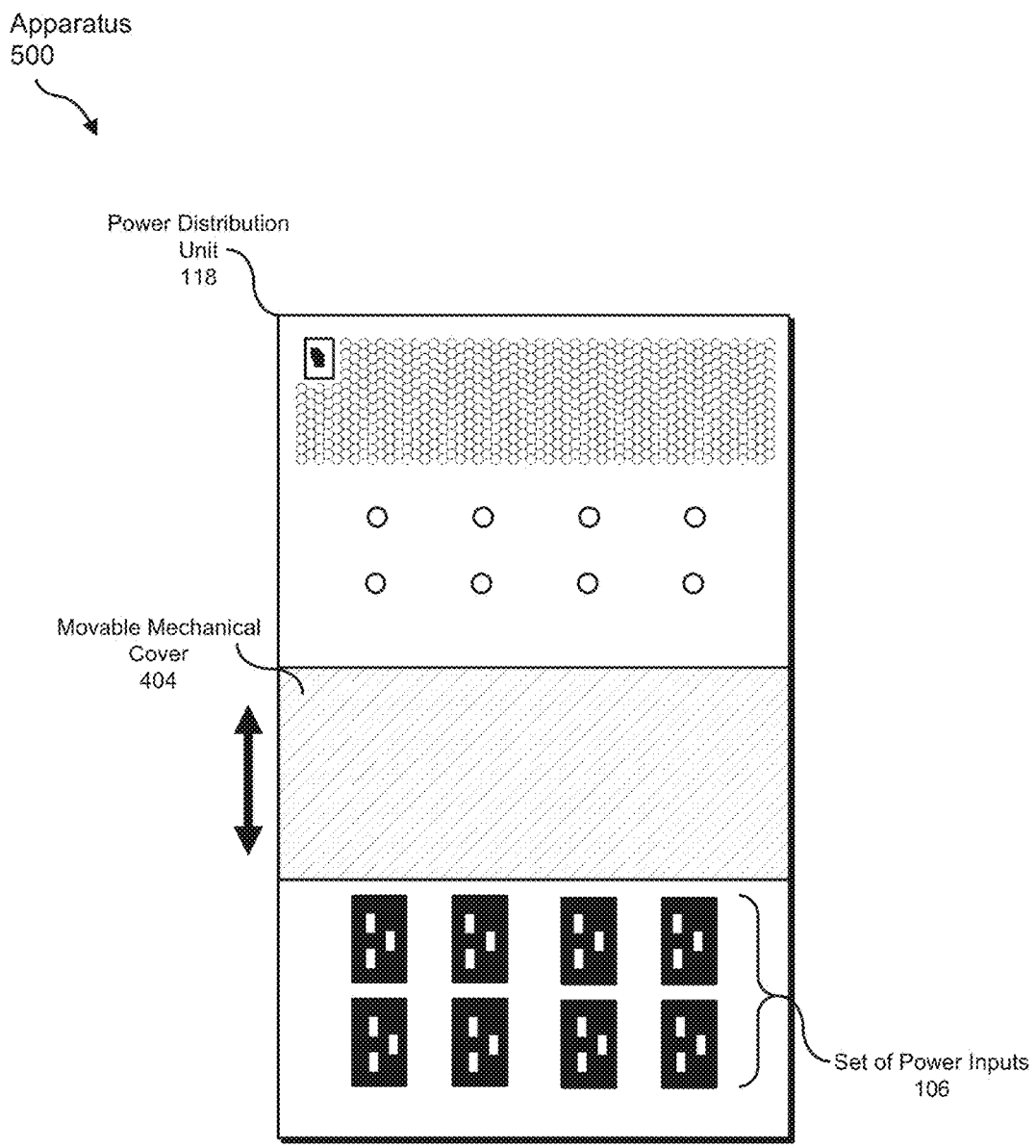
FIG. 5 is a block diagram of an exemplary apparatus for improving network devices' compatibility with different types of power sources.

As illustrated in FIG. 5, movable mechanical cover 404 may slide over set of power inputs 102. By sliding over set of power inputs 102 in this way, movable mechanical cover 404 may effectively prevent exposing set of power inputs 102. Moreover, by preventing exposure of set of power inputs 102, movable mechanical cover 404 may stop a user from electrocuting himself or herself by touching any of power inputs 102 (which may be electrically coupled to set of power inputs 106). Additionally or alternatively, by preventing exposure of set of power inputs 102, movable mechanical cover 404 may stop a user from connecting different power sources to set of power inputs 102 and set of power inputs 106 at the same time (which could potentially cause an electrical short and/or damage the power distribution system at a customer site).

In one example, movable mechanical cover 404 may engage switch 324 when movable mechanical cover 404 is positioned over set of power inputs 102. As a result, switch 324 may provide an electric signal to system control circuit 320. In this example, system control circuit 320 may interpret this electric signal as an indicator that (1) movable mechanical cover 404 is currently positioned over set of power inputs 102 and/or (2) set of power inputs 106 are currently exposed and/or accessible.

As another example, movable mechanical cover 404 may shield and/or cover some of power inputs 102 and some of power inputs 106 at the same time (although not illustrated in FIG. 4 or 5). For example, movable mechanical cover 404 may shield and/or cover the bottom 4 of power inputs 102 and the top 4 of power inputs 106 at the same time. In this example, by shielding and/or covering the bottom 4 of power inputs 102 and the top 4 of power inputs 106 in this way, movable mechanical cover 404 may facilitate exposing the top 4 of power inputs 102 and the bottom 4 of power inputs 106 at the same time. Accordingly, movable mechanical cover 404 may enable a user to connect power sources to the top 4 of power inputs 102 and the bottom 4 of power inputs 106 at the same time.

Additionally or alternatively, movable mechanical cover 404 may engage another switch (not illustrated in FIG. 4 or 5) when movable mechanical cover 404 is positioned over the bottom 4 of power inputs 102 and the top 4 of power inputs 106. As a result, this other switch may provide an electric signal to system control circuit 320. In this example, system control circuit 320 may interpret this electric signal as an indicator that (1) movable mechanical cover 404 is currently positioned over the bottom 4 of power inputs 102 and the top 4 of power inputs 106 and/or (2) the top 4 of power inputs 102 and the bottom 4 of power inputs 106 are currently exposed and/or accessible.

In some examples, system control circuit 320 may use an electric signal provided by switch 324 to determine certain electrical characteristics of the type of power source powering network device 116. In one example, system control circuit 320 may use this electric signal to determine an amount of electric current received by set of power inputs 106. For example, set of power inputs 106 may be compatible with a specific type of 30-amp AC power source. In this example, system control circuit 320 may use an electric signal provided by switch 324 to determine that (1) movable mechanical cover 404 is currently positioned over set of power inputs 102 and/or (2) set of power inputs 106 are currently receiving electric current used to power network device 116. Since set of power inputs 106 are compatible with the specific type of 30-amp AC power source and set of power inputs 106 are currently receiving electric current used to power network device 116, system control circuit 320 may further determine that 30-amp AC power sources are powering network device 116.

Additionally or alternatively, system control circuit 320 may use the electric signal provided by switch 324 to determine an amount of electric power outputted by PSMs 112(1)-(N). For example, 30-amp AC power sources may enable PSMs 112(1)-(N) to each output approximately 4.4 kilowatts of DC power. Upon determining that 30-amp AC power sources are powering network device 116, system control circuit 320 may determine that PSMs 112(1)-(N) are each outputting approximately 4.4 kilowatts of DC power.

In an alternative example, system control circuit 320 may use the lack of an electric signal to determine an amount of electric current received by set of power inputs 102. For example, set of power inputs 102 may be compatible with a specific type of 20-amp AC power source. In this example, system control circuit 320 may use the lack of an electric signal to determine that (1) movable mechanical cover 404 is currently positioned over set of power inputs 106 and/or (2) set of power inputs 102 are currently receiving electric current used to power network device 116. Since set of power inputs 102 are compatible with the specific type of 20-amp AC power source and set of power inputs 102 are currently receiving electric current used to power network device 116, system control circuit 320 may further determine that 20-amp AC power sources are powering network device 116.

Additionally or alternatively, system control circuit 320 may use the lack of an electric signal to determine an amount of electric power outputted by PSMs 112(1)-(N). For example, 20-amp AC power sources may enable PSMs 112(1)-(N) to each output approximately 3 kilowatts of DC power. Upon determining that 20-amp AC power sources are powering network device 116, system control circuit 320 may determine that PSMs 112(1)-(N) are each outputting approximately 3 kilowatts of DC power.

Returning to FIG. 3, apparatus 300 may also include a set of components 322(1)-(N) within network device 116. The term "component," as used herein in connection with a network device, generally refers to any type or form of physical device and/or mechanism that consumes electric power within the network device and/or enables the network device to facilitate the flow of data traffic within a network. Examples of components 322(1)-(N) include, without limitation, Field-Replaceable Units (FRUs), line cards, backplanes, fan trays, Physical Interface Cards (PICs), Flexible PIC Concentrators (FPCs), control boards, routing engines, switch interface boards, connector interface panels, variations of one or more of the same, combinations of one or more of the same, or any other suitable components.

In one example, system control circuit 320 may perform certain load-sharing techniques and/or operations to ensure that PSMs 112(1)-(N) each provide a load proportional to the amount of current received via set of power inputs 102 or set of power inputs 106. For example, system control circuit 320 may allocate electric power to components 322(1)-(N) within network device 116. In this example, system control circuit 320 may balance the electric power outputted by each of PSMs 112(1)-(N) to components 322(1)-(N) based at least in part on the amount of current received by each of PSMs 112(1)-(N).

As a specific example, 20-amp AC power sources may be connected to 4 of power inputs 102, and 30-amp AC power sources may be connected to 4 of power inputs 106. In this example, system control circuit 320 may balance the electric power by directing those PSMs receiving electric current from the 20-amp AC power sources to output 40% of the electric power to the set of components and those PSMs receiving electric current from the 30-amp AC power sources to output 60% of the electric power to the set of components. Accordingly, system control circuit 320 may modify the load-share of PSMs 112(1)-(N) based at least in part on the amount of current received from the different power sources connected to the power inputs.

FIG. 6 is a flow diagram of an exemplary method 600 for improving network devices' compatibility with different types of power sources. Method 600 may include the step of receiving electric current from a power distribution unit of a network device that includes a first set of power inputs that are compatible with a first type of power source and a second set of power inputs that are compatible with a second type of power source that is different from the first type of power source (610). This receiving step may be performed in a variety of ways. For example, set of PSMs 110 may, as part of network device 116, receive electric current from power distribution unit 118. In this example, power distribution unit 118 may facilitate the flow of electric current from one or more of power inputs 102 to set of PSMs 110. Additionally or alternatively, power distribution unit 118 may facilitate the flow of electric current from one or more of power inputs 106 to set of PSMs 110.

Returning to FIG. 6, method 600 may also include the step of outputting electric power to a set of components within the network device based at least in part on an amount of electric current received by each PSM via either the first set of power inputs or the second set of power inputs included in the power distribution unit (620). This outputting step may be performed in a variety of ways. For example, set of PSMs 110 may output electric power to components 322(1)-(N) commensurate with the amount of electric current received via one or more of power inputs 102. Additionally or alternatively, set of PSMs 110 may output electric power to components 322(1)-(N) commensurate with the amount of electric current received via one or more of power inputs 106.

Figure 7:
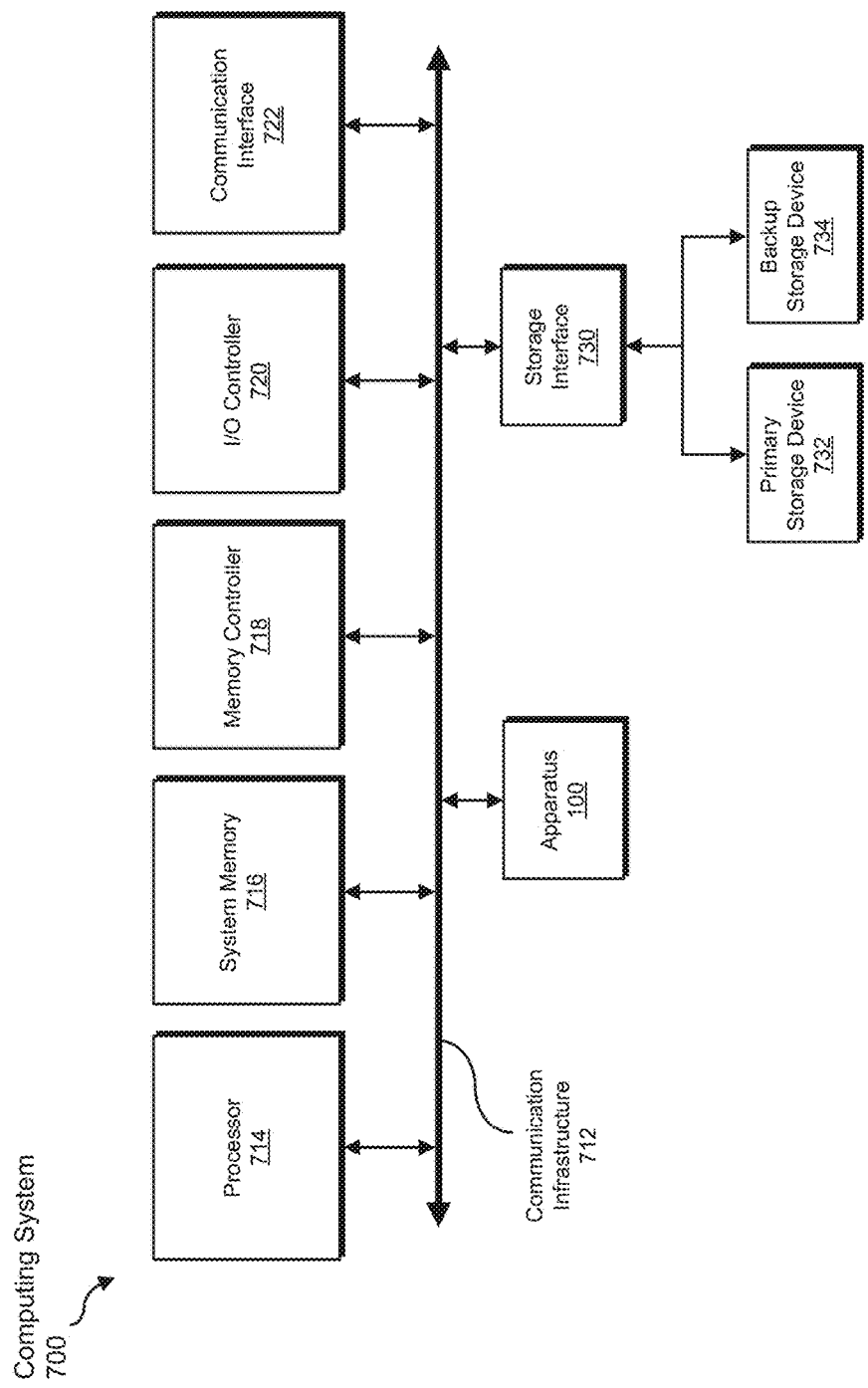
FIG. 7 is a block diagram of an exemplary computing system capable of implementing and/or being used in connection with one or more of the embodiments described and/or illustrated herein.

FIG. 7 is a block diagram of an exemplary computing system 700 capable of implementing and/or being used in connection with one or more of the embodiments described and/or illustrated herein. In some embodiments, all or a portion of computing system 700 may perform and/or be a means for performing, either alone or in combination with other elements, one or more of the steps described in connection with FIG. 6. All or a portion of computing system 700 may also perform and/or be a means for performing and/or implementing any other steps, methods, or processes described and/or illustrated herein. In one example, computing system 700 may include apparatus 100 from FIG. 1.

Computing system 700 broadly represents any type or form of electrical load, including a single or multi-processor computing device or system capable of executing computer-readable instructions. Examples of computing system 700 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 700 may be programmed, configured, and/or otherwise designed to comply with one or more networking protocols. According to certain embodiments, computing system 700 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 700 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 700 may include various network and/or computing components. For example, computing system 700 may include at least one processor 714 and a system memory 716. Processor 714 generally represents any type or form of processing unit capable of processing data or interpreting and executing instructions. For example, processor 714 may represent an application-specific integrated circuit (ASIC), a system on a chip (e.g., a network processor), a hardware accelerator, a general purpose processor, and/or any other suitable processing element.

Processor 714 may process data according to one or more of the networking protocols discussed above. For example, processor 714 may execute or implement a portion of a protocol stack, may process packets, may perform memory operations (e.g., queuing packets for later processing), may execute end-user applications, and/or may perform any other processing tasks.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 700 may include both a volatile memory unit (such as, for example, system memory 716) and a non-volatile storage device (such as, for example, primary storage device 732, as described in detail below). System memory 716 may be implemented as shared memory and/or distributed memory in a network device. Furthermore, system memory 716 may store packets and/or other information used in networking operations.

In certain embodiments, exemplary computing system 700 may also include one or more components or elements in addition to processor 714 and system memory 716. For example, as illustrated in FIG. 7, computing system 700 may include a memory controller 718, an Input/Output (I/O) controller 720, and a communication interface 722, each of which may be interconnected via communication infrastructure 712. Communication infrastructure 712 generally represents any type or form of infrastructure capable of facilitating communication between one or more components of a computing device. Examples of communication infrastructure 712 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 718 generally represents any type or form of device capable of handling memory or data or controlling communication between one or more components of computing system 700. For example, in certain embodiments memory controller 718 may control communication between processor 714, system memory 716, and I/O controller 720 via communication infrastructure 712. In some embodiments, memory controller 718 may include a Direct Memory Access (DMA) unit that may transfer data (e.g., packets) to or from a link adapter.

I/O controller 720 generally represents any type or form of device or module capable of coordinating and/or controlling the input and output functions of a computing device. For example, in certain embodiments I/O controller 720 may control or facilitate transfer of data between one or more elements of computing system 700, such as processor 714, system memory 716, communication interface 722, and storage interface 730.

Communication interface 722 broadly represents any type or form of communication device or adapter capable of facilitating communication between exemplary computing system 700 and one or more additional devices. For example, in certain embodiments communication interface 722 may facilitate communication between computing system 700 and a private or public network including additional computing systems. Examples of communication interface 722 include, without limitation, a link adapter, a wired network interface (such as a network interface card), a wireless network interface (such as a wireless network interface card), and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 722 may also represent a host adapter configured to facilitate communication between computing system 700 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also enable computing system 700 to engage in distributed or remote computing. For example, communication interface 722 may receive instructions from a remote device or send instructions to a remote device for execution.

As illustrated in FIG. 7, exemplary computing system 700 may also include a primary storage device 732 and/or a backup storage device 734 coupled to communication infrastructure 712 via a storage interface 730. Storage devices 732 and 734 generally represent any type or form of storage device or medium capable of storing data and/or other computer-readable instructions. For example, storage devices 732 and 734 may represent a magnetic disk drive (e.g., a so-called hard drive), a solid state drive, a floppy disk drive, a magnetic tape drive, an optical disk drive, a flash drive, or the like. Storage interface 730 generally represents any type or form of interface or device for transferring data between storage devices 732 and 734 and other components of computing system 700.

In certain embodiments, storage devices 732 and 734 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 734 may also include other similar structures or devices for allowing computer software, data, or other computer-readable instructions to be loaded into computing system 700. For example, storage devices 732 and 734 may be configured to read and write software, data, or other computer-readable information. Storage devices 732 and 734 may be a part of computing system 700 or may be separate devices accessed through other interface systems.

Many other devices or subsystems may be connected to computing system 700. Conversely, all of the components and devices illustrated in FIG. 7 need not be present to practice the embodiments described and/or illustrated herein. The devices and subsystems referenced above may also be interconnected in different ways from those shown in FIG. 7. Computing system 700 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of apparatus 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An apparatus comprising:
a power distribution unit that distributes electric power to a network device, the power distribution unit comprising:
   a first set of power inputs that each include a first type of physical coupler that is compatible with a first type of power source and has a first maximum current rating; and
   a second set of power inputs that each include a second type of physical coupler that:
      is different from the first type of physical coupler;
      is compatible with a second type of power source that is different from the first type of power source;
      is incompatible with the first type of power source; and
      has a second maximum current rating that is greater than the first maximum current rating;
a set of power supply modules electrically coupled to the power distribution unit, each power supply module within the set of power supply modules being capable of outputting electric power to the network device upon receiving current via either the first set of power inputs or the second set of power inputs;
a movable mechanical cover that prevents the power distribution unit from simultaneously exposing:
   the first set of power inputs; and
   the second set of power inputs;
a system control circuit communicatively coupled to the set of power supply modules;
a switch that mechanically interfaces with the movable mechanical cover and is communicatively coupled to the system control circuit, the switch providing, to the system control circuit, a signal that indicates whether the first set of power inputs or the second set of power inputs are exposed by the movable mechanical cover; and
wherein the system control circuit uses the signal to determine an amount of current received by either the first set of power inputs or the second set of power inputs.

2. The apparatus of claim 1, wherein the electric power outputted by a power supply module within the set of power supply modules is commensurate with an amount of current received by the power supply module via either the first set of power inputs or the second set of power inputs.

3. The apparatus of claim 1, wherein:
the first set of power inputs comprises a first set of Alternating Current (AC) power inputs;
the second set of power inputs comprises a second set of AC power inputs; and
each power supply module within the set of power supply modules converts the current received via either the first set of AC power inputs or the second set of AC power inputs from AC to Direct Current (DC).

4. The apparatus of claim 1, wherein:
the first set of power inputs comprises a first set of DC power inputs;
the second set of power inputs comprises a second set of DC power inputs; and
each power supply module within the set of power supply modules regulates a voltage level outputted to the network device upon receiving the current via either the first set of DC power inputs or the second set of DC power inputs.

5. The apparatus of claim 1, wherein the system control circuit further uses the signal to determine an amount of electric power outputted by each power supply module within the set of power supply modules.

6. The apparatus of claim 1, further comprising a set of components within the network device;
wherein the system control circuit:
   allocates the electric power to the set of components within the network device; and
   balances the electric power outputted by the set of power supply modules based at least in part on an amount of current received by each power supply module within the set of power supply modules.

7. A network device comprising:
a network interface;
a power distribution unit that distributes electric power to the network interface, the power distribution unit comprising:
   a first set of power inputs that each include a first type of physical coupler that is compatible with a first type of power source and has a first maximum current rating; and
   a second set of power inputs that each include a second type of physical coupler that:
      is different from the first type of physical coupler;
      is compatible with a second type of power source that is different from the first type of power source;
      is incompatible with the first type of power source; and
      has a second maximum current rating that is greater than the first maximum current rating;
a set of power supply modules electrically coupled to the power distribution unit, each power supply module within the set of power supply modules being capable of outputting electric power to the network interface upon receiving current via either the first set of power inputs or the second set of power inputs;
a movable mechanical cover that prevents the power distribution unit from simultaneously exposing:
   the first set of power inputs; and
   the second set of power inputs;
a system control circuit communicatively coupled to the set of power supply modules;
a switch that mechanically interfaces with the movable mechanical cover and is communicatively coupled to the system control circuit, the switch providing, to the system control circuit, a signal that indicates whether the first set of power inputs or the second set of power inputs are exposed by the movable mechanical cover; and
wherein the system control circuit uses the signal to determine an amount of current received by either the first set of power inputs or the second set of power inputs.

8. The network device of claim 7, wherein the electric power outputted by a power supply module within the set of power supply modules is commensurate with an amount of current received by the power supply module via either the first set of power inputs or the second set of power inputs.

9. The network device of claim 7, wherein:
the first set of power inputs comprises a first set of AC power inputs;
the second set of power inputs comprises a second set of AC power inputs; and
each power supply module within the set of power supply modules converts the current received via either the first set of AC power inputs or the second set of AC power inputs from AC to DC.

10. The network device of claim 7, wherein:
the first set of power inputs comprises a first set of DC power inputs;
the second set of power inputs comprises a second set of DC power inputs; and
each power supply module within the set of power supply modules regulates a voltage level outputted to the network device upon receiving the current via either the first set of DC power inputs or the second set of DC power inputs.

11. The network device of claim 7, wherein the signal provided by the switch is further used to determine an amount of electric power outputted by each power supply module within the set of power supply modules.

12. The network device of claim 7, further comprising a set of components within the network device;
wherein the system control circuit:
allocates the electric power to the set of components within the network device; and
balances the electric power outputted by the set of power supply modules based at least in part on an amount of current received by each power supply module within the set of power supply modules.

13. A method comprising:
receiving, by a set of power supply modules, electric current from a power distribution unit of a network device that comprises:
a first set of power inputs that each include a first type of physical coupler that is compatible with a first type of power source and has a first maximum current rating; and
a second set of power inputs that each include a second type of physical coupler that:
is different from the first type of physical coupler;
is compatible with a second type of power source that is different from the first type of power source;
is incompatible with the first type of power source; and
has a second maximum current rating that is greater than the first maximum current rating;
outputting, by the set of power supply modules, electric power to a set of components within the network device based at least in part on an amount of electric current received by each power supply module within the set of power supply modules via either the first set of power inputs or the second set of power inputs included in the power distribution unit;
providing a movable mechanical cover that prevents the power distribution unit from simultaneously exposing:
the first set of power inputs; and
the second set of power inputs;
communicatively coupling a system control circuit communicatively coupled to the set of power supply modules;
communicatively coupling a switch that mechanically interfaces with the movable mechanical cover to the system control circuit such that the switch provides, to the system control circuit, a signal that indicates whether the first set of power inputs or the second set of power inputs are exposed by the movable mechanical cover; and
using the signal provided by the switch to determine an amount of current received by either the first set of power inputs or the second set of power inputs.

14. The method of claim 13, further comprising preventing the power distribution unit from simultaneously exposing the first set of power inputs and the second set of power inputs by covering either the first set of power inputs or the second set of power inputs via a movable mechanical cover.

15. The apparatus of claim 1, wherein:
the first type of physical coupler comprises a C13/C14 coupler; and
the second type of physical coupler comprises a C19/C20 coupler.

16. The network device of claim 7, wherein:
the first type of physical coupler comprises a C13/C14 coupler; and
the second type of physical coupler comprises a C19/C20 coupler.

* * * * *